United States Patent
Klassen et al.

(10) Patent No.: US 8,665,469 B2
(45) Date of Patent: Mar. 4, 2014

(54) PAGE PARALLEL RIP WITH INTERLEAVED CHUNKS

(75) Inventors: R. Victor Klassen, Webster, NY (US); Stephen C. Morgana, Rochester, NY (US); Peter A. Crean, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 12/703,261

(22) Filed: Feb. 10, 2010

(65) Prior Publication Data

US 2011/0194137 A1 Aug. 11, 2011

(51) Int. Cl.
*G06F 3/12* (2006.01)

(52) U.S. Cl.
USPC ........ 358/1.15; 358/1.13; 358/1.18; 382/282; 382/284; 715/764

(58) Field of Classification Search
USPC .............. 358/1.13, 1.15, 1.18; 382/282, 284; 715/764
See application file for complete search history.

(56) References Cited

U.S. PATENT DOCUMENTS

| | | | |
|---|---|---|---|
| 6,817,791 B2 | 11/2004 | Klassen | |
| 7,161,705 B2 | 1/2007 | Klassen | |
| 8,064,084 B2 * | 11/2011 | Khain | 358/1.15 |
| 2002/0060801 A1 * | 5/2002 | Motamed et al. | 358/1.13 |
| 2004/0196496 A1 | 10/2004 | Klassen | |
| 2004/0196497 A1 | 10/2004 | Klassen et al. | |
| 2004/0196498 A1 * | 10/2004 | Klassen | 358/1.15 |
| 2009/0080025 A1 * | 3/2009 | Aronshtam et al. | 358/1.17 |
| 2009/0161163 A1 | 6/2009 | Klassen et al. | |
| 2010/0202008 A1 * | 8/2010 | Aronshtam et al. | 358/1.15 |

* cited by examiner

*Primary Examiner* — Jacky X Zheng
(74) *Attorney, Agent, or Firm* — Fay Sharpe LLP (57) ABSTRACT

Systems and methods are described that facilitate distributing a raster image processing task for an input file (e.g., an electronic document) across a plurality of nodes (e.g., computers) in a network. The input file is received at a first node, which becomes the controlling node and splits the pages of the input file into interleaved chunks such that adjacent pages are allocated to different chunks (i.e., no chunk contains adjacent pages in the document). Chunks are then assigned to different nodes for concurrent raster image processing. Once complete, the processed pages are returned to the controller node, which logically orders the pages into their original sequential order, and outputs the logically ordered, raster image processed pages to a printer, where they are printed.

4 Claims, 5 Drawing Sheets

PAGE PARALLEL RIP WITH INTERLEAVED CHUNKS

BACKGROUND

The subject application relates to raster image processing (RIP) systems and methods. While the systems and methods described herein relate to page parallel raster image processing and the like, it will be appreciated that the described techniques may find application in other image processing systems, other xerographic applications, and/or other image processing methods.

In a classical page parallel RIP system, jobs are sent to a print service spooling mechanism, which includes such features as saving (non-streaming) jobs to disk (for recovery), guessing the page description language, and extracting job ticket information. A description of the job is passed through various mechanisms to the page parallel RIP supervisor (ppr_supervisor), which passes it on to a splitter.

The supervisor is aware of all of the parallel RIP processes available, and assigns chunks of the job to the available RIPs. In steady state, the supervisor maintains a model of the time it takes to complete a chunk based on past experience with each of the RIP nodes (which need not be homogeneous), and various chunk characteristics determined by the splitter and passed to the supervisor. The supervisor assigns chunks to the various RIPs, by sending messages to the splitter, informing it of the chunk destinations, and the splitters then write the chunks of the file directly in to the RIPs' file systems and/or memory. To keep the RIPs from needing to wait, the supervisor generally assigns chunks before the RIPs are idle, allowing each of them to accumulate a small (1-3 chunk) queue of unstarted work. To keep the splitter from needing to wait, the supervisor allows the splitter to accumulate a small queue of unstarted work, as well. The queues are kept short so as to keep the estimates of time to completion from being too far off.

As RIPs complete chunks, they send messages to the supervisor, which forwards them to the collector. The collector maintains a queue of completed chunks for each job, and then reports back completed chunks in the order of job submission, and then page order.

The size of a chunk is controlled by configuration variables: a chunk is complete at the end of the next page after one of two thresholds is reached: either the number of pages or the number of Mbytes in the chunk exceeds a specified threshold.

As a paper example, Table 1 shows the series of RIP times in seconds for pages in a theoretical job.

TABLE 1

| Page # | RIP time |
| --- | --- |
| 1 | 2.54 |
| 2 | 2.02 |
| 3 | 2.16 |
| 4 | 2.24 |
| 5 | 1.80 |
| 6 | 2.02 |
| 7 | 2.25 |
| 8 | 1.65 |
| 9 | 2.36 |
| 10 | 1.69 |
| 11 | 1.78 |
| 12 | 1.77 |
| 13 | 2.09 |
| 14 | 2.27 |
| 15 | 2.21 |
| 16 | 1.73 |
| 17 | 1.94 |
| 18 | 1.87 |
| 19 | 1.91 |
| 20 | 1.61 |
| 21 | 2.29 |
| 22 | 1.97 |
| 23 | 2.09 |
| 24 | 2.17 |
| 25 | 1.94 |
| 26 | 2.23 |
| 27 | 2.34 |
| 28 | 2.07 |
| 29 | 1.87 |
| 30 | 2.38 |
| 31 | 2.26 |
| 32 | 2.05 |
| 33 | 2.15 |
| 34 | 1.98 |
| 35 | 1.94 |
| 36 | 2.05 |
| 37 | 1.74 |
| 38 | 2.21 |
| 39 | 1.81 |
| 40 | 2.11 |
| 41 | 1.96 |
| 42 | 2.37 |
| 43 | 1.80 |
| 44 | 2.03 |
| 45 | 1.62 |
| 46 | 2.44 |
| 47 | 1.58 |
| 48 | 1.63 |
| 49 | 1.78 |
| 50 | 2.21 |
| 51 | 1.82 |
| 52 | 2.03 |
| 53 | 2.17 |
| 54 | 2.43 |
| 55 | 2.05 |
| 56 | 1.70 |
| 57 | 2.16 |
| 58 | 1.63 |
| 59 | 2.05 |
| 60 | 2.17 |
| 61 | 2.18 |
| 62 | 1.96 |
| 63 | 2.04 |
| 64 | 2.31 |
| 65 | 2.53 |
| 66 | 2.10 |
| 67 | 2.42 |
| 68 | 2.25 |
| 69 | 1.97 |
| 70 | 2.51 |
| 71 | 1.59 |
| 72 | 2.10 |
| 73 | 1.99 |
| 74 | 2.30 |
| 75 | 2.52 |
| 76 | 1.98 |
| 77 | 2.00 |
| 78 | 1.71 |
| 79 | 2.26 |
| 80 | 2.07 |

Ignoring any startup overhead, the RIP time of a given chunk is the sum of the RIP times of the pages within it; start-up overhead has been measured at 0.5-0.8 seconds. For the sake of discussion, an overhead of 0.5 seconds, 6 page chunks, and five RIPs are assumed (values chosen to simplify the illustration). Further, a constant split time of 0.005 seconds per chunk (which is approximately correct) is assumed. After 0.0025 seconds, all six RIPs are actively processing chunks.

Table 2 shows the series of events, in page number order, for the first 66 pages.

TABLE 2

| Chunk # | RIP Node | Page # | RIP time | Start time | End time |
|---|---|---|---|---|---|
| 1 | 1 | 1 | 2.54 | 0.0005 | 3.04 |
| 1 | 1 | 2 | 2.02 | 3.04 | 5.07 |
| 1 | 1 | 3 | 2.16 | 5.07 | 7.23 |
| 1 | 1 | 4 | 2.24 | 7.23 | 9.47 |
| 1 | 1 | 5 | 1.80 | 9.47 | 11.27 |
| 1 | 1 | 6 | 2.02 | 11.27 | 13.29 |
| 2 | 2 | 7 | 2.25 | 0.0010 | 2.75 |
| 2 | 2 | 8 | 1.65 | 2.75 | 4.40 |
| 2 | 2 | 9 | 2.36 | 4.41 | 6.77 |
| 2 | 2 | 10 | 1.69 | 6.78 | 8.46 |
| 2 | 2 | 11 | 1.78 | 8.47 | 10.25 |
| 2 | 2 | 12 | 1.77 | 10.26 | 12.03 |
| 3 | 3 | 13 | 2.09 | 0.0015 | 2.59 |
| 3 | 3 | 14 | 2.27 | 2.59 | 4.86 |
| 3 | 3 | 15 | 2.21 | 4.86 | 7.07 |
| 3 | 3 | 16 | 1.73 | 7.08 | 8.80 |
| 3 | 3 | 17 | 1.94 | 8.81 | 10.75 |
| 3 | 3 | 18 | 1.87 | 10.75 | 12.62 |
| 4 | 4 | 19 | 1.91 | 0.0020 | 2.42 |
| 4 | 4 | 20 | 1.61 | 2.42 | 4.03 |
| 4 | 4 | 21 | 2.29 | 4.03 | 6.32 |
| 4 | 4 | 22 | 1.97 | 6.33 | 8.30 |
| 4 | 4 | 23 | 2.09 | 8.30 | 10.39 |
| 4 | 4 | 24 | 2.17 | 10.39 | 12.57 |
| 5 | 5 | 25 | 1.94 | 0.0025 | 2.44 |
| 5 | 5 | 26 | 2.23 | 2.45 | 4.68 |
| 5 | 5 | 27 | 2.34 | 4.68 | 7.02 |
| 5 | 5 | 28 | 2.07 | 7.03 | 9.10 |
| 5 | 5 | 29 | 1.87 | 9.11 | 10.97 |
| 5 | 5 | 30 | 2.38 | 10.98 | 13.35 |
| 6 | 2 | 31 | 2.26 | 12.03 | 14.79 |
| 6 | 2 | 32 | 2.05 | 14.80 | 16.85 |
| 6 | 2 | 33 | 2.15 | 16.85 | 19.01 |
| 6 | 2 | 34 | 1.98 | 19.01 | 20.99 |
| 6 | 2 | 35 | 1.94 | 21.00 | 22.94 |
| 6 | 2 | 36 | 2.05 | 22.94 | 24.99 |
| 7 | 4 | 37 | 1.74 | 12.57 | 14.81 |
| 7 | 4 | 38 | 2.21 | 14.81 | 17.02 |
| 7 | 4 | 39 | 1.81 | 17.03 | 18.84 |
| 7 | 4 | 40 | 2.11 | 18.84 | 20.95 |
| 7 | 4 | 41 | 1.96 | 20.95 | 22.92 |
| 7 | 4 | 42 | 2.37 | 22.92 | 25.29 |
| 8 | 3 | 43 | 1.80 | 12.62 | 14.92 |
| 8 | 3 | 44 | 2.03 | 14.92 | 16.95 |
| 8 | 3 | 45 | 1.62 | 16.95 | 18.58 |
| 8 | 3 | 46 | 2.44 | 18.58 | 21.02 |
| 8 | 3 | 47 | 1.58 | 21.02 | 22.60 |
| 8 | 3 | 48 | 1.63 | 22.61 | 24.23 |
| 9 | 1 | 49 | 1.78 | 13.29 | 15.57 |
| 9 | 1 | 50 | 2.21 | 15.58 | 17.79 |
| 9 | 1 | 51 | 1.82 | 17.79 | 19.61 |
| 9 | 1 | 52 | 2.03 | 19.62 | 21.65 |
| 9 | 1 | 53 | 2.17 | 21.65 | 23.82 |
| 9 | 1 | 54 | 2.43 | 23.83 | 26.25 |
| 10 | 5 | 55 | 2.05 | 13.35 | 15.91 |
| 10 | 5 | 56 | 1.70 | 15.91 | 17.61 |
| 10 | 5 | 57 | 2.16 | 17.62 | 19.77 |
| 10 | 5 | 58 | 1.63 | 19.78 | 21.40 |
| 10 | 5 | 59 | 2.05 | 21.41 | 23.46 |
| 10 | 5 | 60 | 2.17 | 23.46 | 25.63 |
| 11 | 3 | 61 | 2.18 | 24.23 | 26.91 |
| 11 | 3 | 62 | 1.96 | 26.92 | 28.88 |
| 11 | 3 | 63 | 2.04 | 28.88 | 30.93 |
| 11 | 3 | 64 | 2.31 | 30.93 | 33.24 |
| 11 | 3 | 65 | 2.53 | 33.24 | 35.77 |
| 11 | 3 | 66 | 2.10 | 35.78 | 37.88 |

In the example of Table 2, the first chunk begins to RIP after 0.0005 seconds, and is completed after 13.29 seconds. The second chunk is concurrently processed over the interval beginning at 0.001 seconds and running through 12.03 seconds. The fifth chunk completes at 13.35 seconds. The sixth chunk is assigned to RIP node #2, since it is the first one to become available.

Note that by the time the first chunk completes, (13.29 seconds in) 29 pages are ready, of which only six are part of that chunk. The others are all buffered, waiting for this chunk to complete. Similarly, when the sixth chunk completes, 21 pages from other chunks are ready, but waiting to be released. In a large system, there may be dozens of concurrent RIP processes, with correspondingly more pages buffered and waiting.

In a large, distributed system, as pages become available, they are transferred to a buffer closer to the printer. At this point, imposition (combining logical pages to form a physical sheet side) may also be performed. Since adjacent pages tend to be on a single node, the demand on that node is increased while those pages are transferred.

Accordingly, there is an unmet need for systems and/or methods that facilitate distributing adjacent pages to be processed among different RIPs in order to improve processing speed and efficiency, and the like, while overcoming the aforementioned deficiencies.

BRIEF DESCRIPTION

In accordance with various aspects described herein, systems and methods are described that facilitate raster image processing of interleaved chunks comprising non-adjacent pages of an input file. According to one aspect, a method of raster image processing a print job using interleaved chunks comprises receiving a print job input file at a controller node for raster image processing wherein the input file comprises a plurality of pages, and generating interleaved chunks comprising at least two non-adjacent pages from the input file. The method additionally comprises allocating chunks to at least one subordinate node, raster image processing the allocated chunks concurrently at the at least one subordinate node, and receiving descriptions of raster image processed pages. Additionally, the method comprises logically ordering descriptions of received pages, and storing the logically ordered, raster image processed pages for output.

According to another feature described herein, a system that facilitates raster image processing interleaved chunks in a distributed computing network comprises at least one subordinate node comprising a raster image processor and which receives at least one interleaved chunk for raster image processing, and a controller node, operatively coupled to the at least one subordinate node, that receives an input file comprising a plurality of pages for raster image processing. The controller node comprises a supervisor module that provides at least one of a skip count (N) and a page list for generating interleaved chunks comprising at least two non-adjacent pages of the input file, and a splitter module that generates the interleaved chunks using one of the skip count and the page list in order to identify the at least two non-adjacent pages for inclusion in each interleaved chunk. The controller node further comprises a collector module that receives an indication that at least one raster image processed page is complete, and reports page number information for the at least one raster image processed page to the supervisor module. The collector module logically orders all raster image processed pages as they are completed.

Yet another feature relates to a method of raster image processing a print job using interleaved chunks, comprising receiving a PostScript-formatted print job input file at a controller node for raster image processing, the input file comprising a plurality of pages. The method further comprises initiating interleaved chunk generation, wherein each chunk comprises at least two non-adjacent pages from the input file, and allocating chunks to at least one subordinate node before each chunk is complete. Additionally, the method comprises permitting raster image processors in the at least one subordinate node to begin processing the allocated, incomplete chunks, and closing each chunk when the chunk is completely generated. An end-of-file message is sent to each raster image processor when its respective chunk is completely generated and closed. The method further comprises receiving descriptions of raster image processed pages, and logically ordering descriptions of the received pages.

DETAILED DESCRIPTION

In accordance with various features described herein, systems and methods are described that overcome the above-described problems by interleaving pages of each chunk, such that adjacent pages in a print job are not assigned to the same chunk. In one example, each chunk comprises every Nth page in the print job, where N is an integer representing a number of pages skipped (e.g., every other page, every third page, every fifth page, etc.). In another example, pages are randomly assigned to chunks, so long as no two adjacent pages are assigned to the same chunk. In another example, page lists for each chunk are generated, with no two adjacent pages being assigned to the same chunk.

Figure 1:
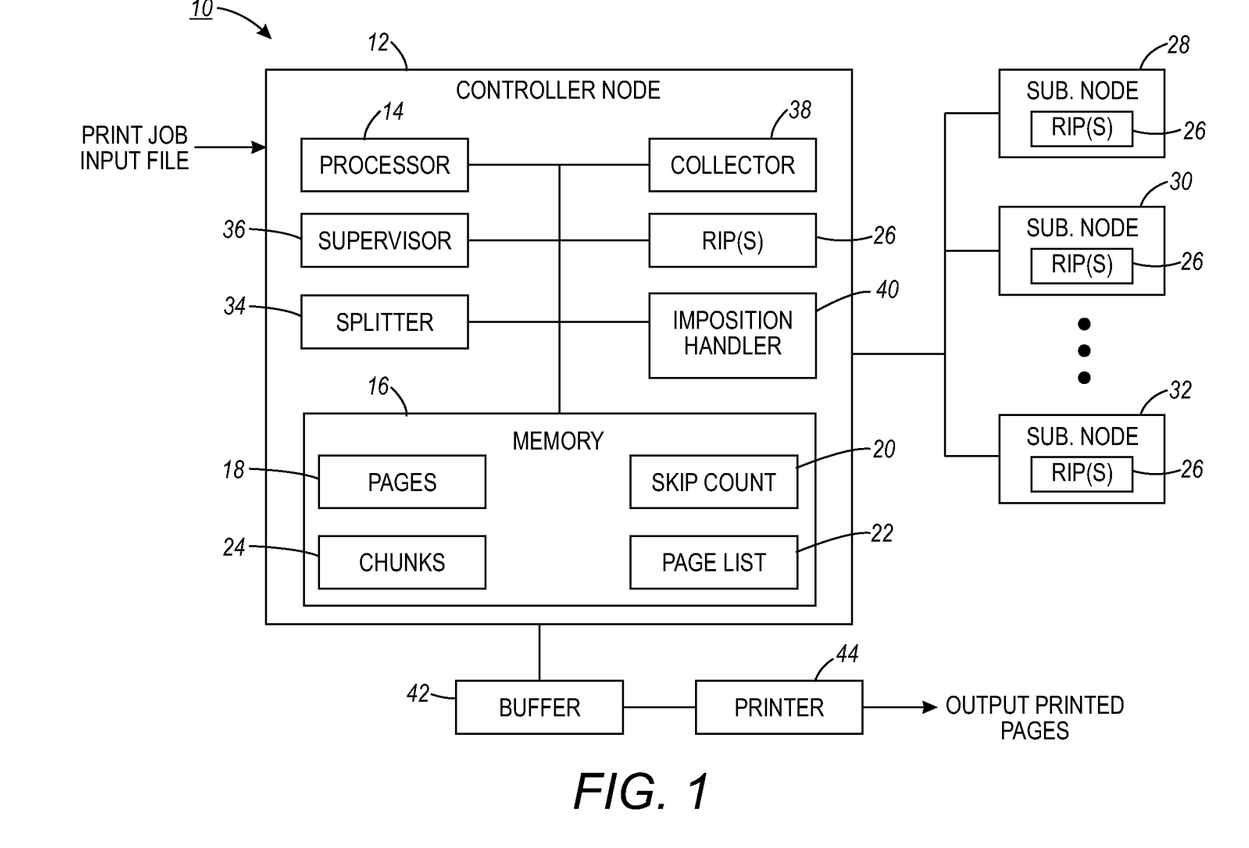
FIG. 1 illustrates a page parallel RIP system 10 includes a first node (controller node) that comprises a plurality of components for performing page parallel raster image processing using interleaved chunks, in accordance with one or more aspects described herein.

With reference to FIG. 1, a page parallel RIP system 10 includes a controller node 12 that comprises a plurality of components for performing page parallel raster image processing using interleaved chunks, in accordance with one or more aspects described herein. Controller node 12 is a governing node that includes a processor 14 coupled to a memory 16, which stores information describing pages 18 (e.g., including input page data, RIPed page data, etc.) in a print job input file to be processed. The memory also stores a skip count 20 (e.g., an integer value N that is greater than or 1) and/or a page number list 22. Non-adjacent pages are chunked or grouped into a plurality of chunks 24 using the skip count 20 or page number list 22. Controller node 12 also includes a one or more raster image processors (RIPs) 26 that process pages in a chunk assigned to Controller node.

The system 10 further comprises a plurality of other subordinate nodes, such as node 28, node 30, and so on, up to an $M^{th}$ node 32 (e.g., any number of nodes may be employed in accordance with the systems and methods described herein). Each node in the system 10 includes a RIP module 26 that processes pages in one or more chunks assigned to the node. It will be appreciated that each node in the system 10 additionally includes associated memory and processing components for storing chunks, pages, computer-executable RIPing instructions, and any other information suitable for carrying out the herein-described functions and methods.

A splitter 34 receives skip count information 20 and/or page list information 22 from a supervisor, and creates chunks 24 of non-contiguous pages, in the page parallel system, in such a way as to distribute processing of adjacent pages to different RIPs 26 at different nodes. According to one aspect, adjacent pages are distributed to distinct physical RIP nodes for processing. Multiple chunks may be concurrently RIPed on the same node, by separate RIPs 26. According to another aspect, chunks containing adjacent pages are RIPed on separate nodes.

According to another aspect, page size is analyzed, e.g., by the processor 14 and/or the splitter 34, to generate chunks of similar sizes for each node. For instance a first chunk may comprise two non-adjacent pages of approximately 5 MB, and a second chunk may include three non-adjacent pages of approximately 3 MB. Optionally, chunk size can be a function of processing power and/or resource (e.g. memory availability, processor availability) at subordinate node, such that smaller chunks may be generated for a subordinate node with less processing power and larger chunks may be generated for a subordinate node with greater capability.

The supervisor 36 assigns work to the first RIP 26 expected to be free. In order to both distribute the work load among nodes and distribute the pages to reduce pinch points when the pages are being read out to go to the print engine, the supervisor 36 assigns work to one RIP 26 per distributed node, if there is more than one RIP expected to be free at the same time. This is the case when there are at least two RIPs idle, and they are on different nodes. This causes the initial assignment to follow a round-robin protocol, maximizing the number of separate processing nodes that are active in the early stages of a job. Once all nodes are busy, the assignment of work may be performed using a slight modification of round-robin that tends to minimize the amount of output buffering needed and minimize the amount of data being pulled from any one node as it is written to the printer.

A collector 38 is informed of the page numbers within each chunk 24, and when pages are complete it reports the page completions in the correct order to the supervisor 36 and/or processor 14. In one example, the collector 38 is implemented as a separate process. In another example, the collector 38 is implemented as a separate thread within the supervisor 36 or processor 14.

Controller node 12 further comprises an imposition handler 40 that ensures that adjacent sheets (e.g., where each sheet comprises multiple pages that may or may not be consecutive, such as where multiple pages are printed on a single sheet, which is subsequently cut and/or folded for insertion into a book or the like) are not included in a single chunk when an imposition scheme is employed. According to one embodiment, imposition is performed on the RIP nodes. In this case, the split chunks contain all logical pages for a given sheet, but sheets follow a skip pattern as for pages in the non-imposition mode.

Additionally, the system 10 includes a buffer that buffers (stores) completed pages that have been RIPed and logically ordered by the processor 14 and/or the supervisor 36, until they are printed by a printer 44 e.g., a marker module, a print engine, etc.).

The system 10 may be viewed as a network of nodes, wherein each node is a computer (e.g., a personal computer, laptop, or some other computing device). Any node receiving the input file can operate as the controller node, and all nodes comprise the hardware and software described with regard thereto. All other nodes in the system then become subordinate nodes to controller node.

As previously mentioned, the controller node 12 comprises the processor 14 that executes, and memory 16 (e.g., a computer-readable medium) that stores, computer-executable instructions and/or computer-readable data for performing the various techniques and/or methods described herein. The memory 16 may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a ROM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

Additionally, it will be appreciated that according to one or more aspects, the supervisor, splitter, collector, and imposition handler may be viewed as software modules (e.g., sets of computer-executable instructions) that may be stored in the memory 16 or on a different computer-readable medium and executed by the processor 14 to perform the described functions, acts, methods, etc.

Figure 2:
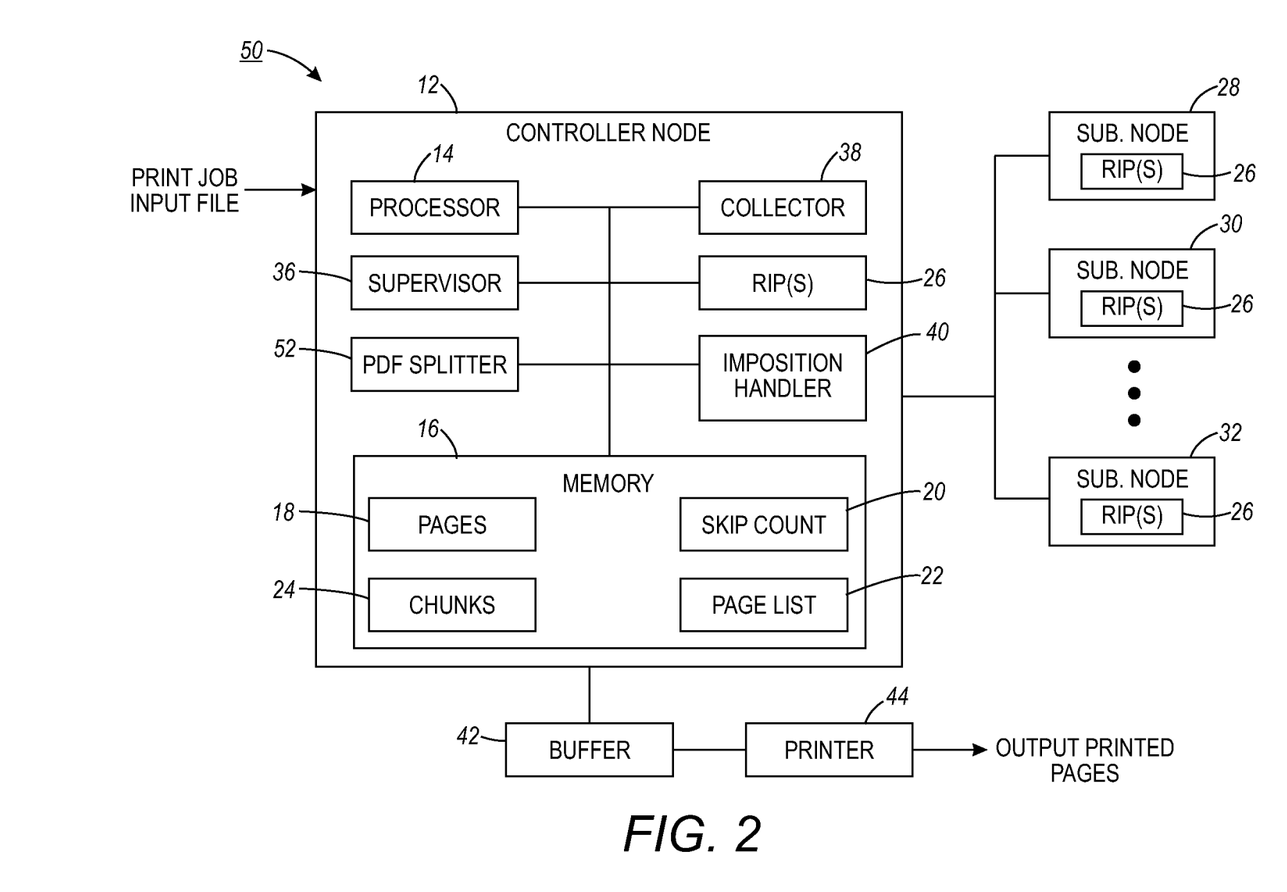
FIG. 2 illustrates a page parallel RIP system with a PDF splitter, in accordance with one or more aspects described herein.

FIG. 2 illustrates a page parallel RIP system 50 with a PDF splitter 52, in accordance with one or more aspects described herein. The system 50 includes a governing node, controller node 12, and a plurality of subordinate nodes 28, 30, 32, each having at least one RIP module 26. Controller node 12 includes a processor 14 and memory 16 that stores page information 18 (e.g., including input page data, RIPed page data, etc.), skip count information 20, page list information 22, chunk information 24, etc. Controller node 12 further comprises the PDF splitter 52, a supervisor module 36, a collector module 38, and optionally an imposition handler module 40. Additionally, a buffer 42 is coupled to the controller node 12 and to a printer 44 (e.g., a print engine, marker module or the like).

The PDF splitter is given either a list of page numbers (e.g., page list 22) or a skip count 20 by the supervisor 36, and, because PDF is random-access, the PDF splitter 52 extracts the appropriate pages from an input file and generates chunks 24 accordingly. The collector 38 is informed of the page numbers within each chunk 24, and when pages are complete it reports completions to the supervisor in the correct order. The supervisor 36 logically orders the pages as they are completed and outputs them to the buffer 42 for storage until they are printed by the printer 44.

Figure 3:
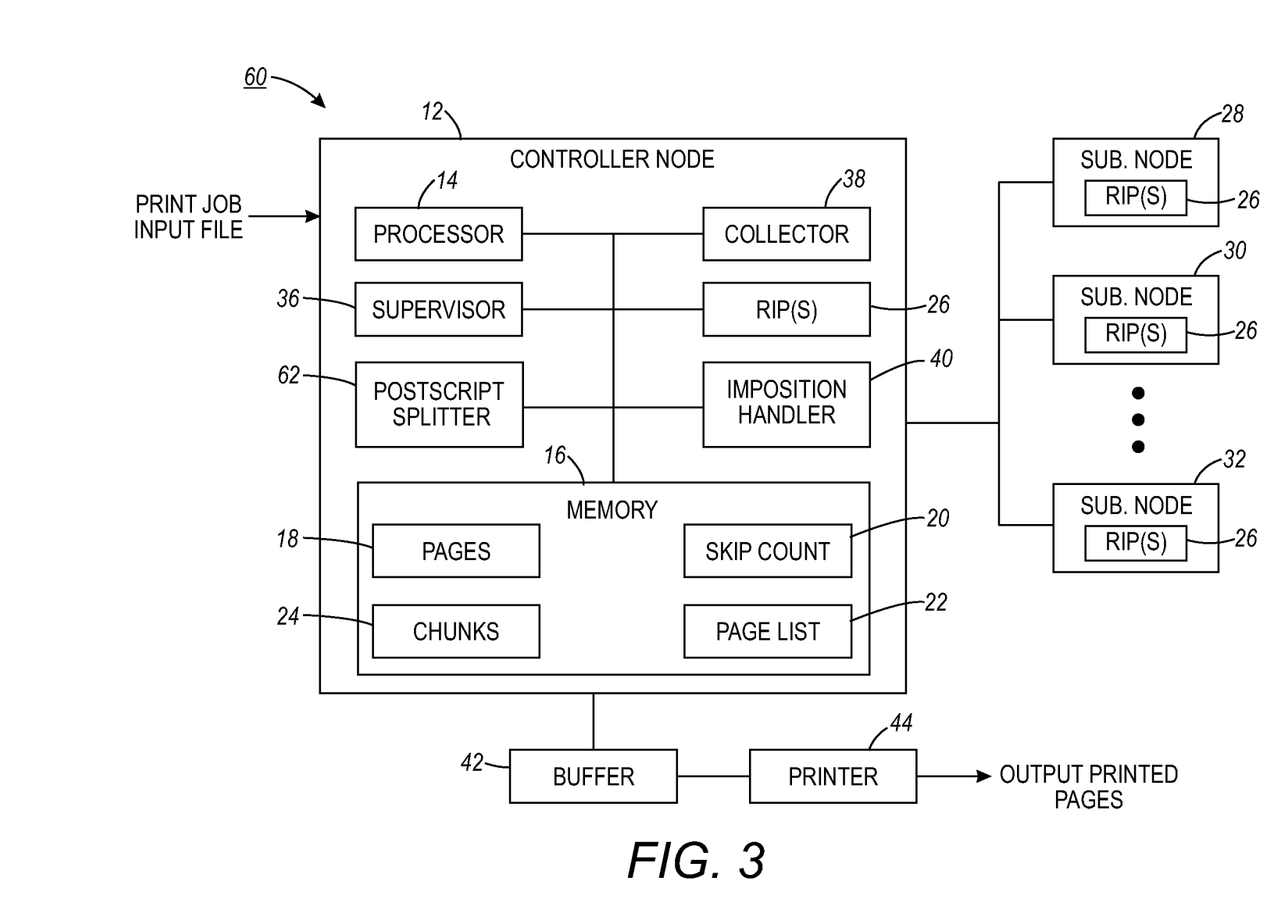
FIG. 3 illustrates a page parallel RIP system with a PostScript splitter, in accordance with one or more aspects described herein.

FIG. 3 illustrates a page parallel RIP system 60 with a PostScript splitter 62, in accordance with one or more aspects described herein. The system 60 includes a plurality of nodes 12, 28, 30, 32, each having at least one RIP module 26. Controller node 12 includes a processor 14 and memory 16, which stores page information 18 (e.g., including input page data, RIPed page data, etc.), skip count information 20, page list information 22, chunk information 24, etc. Controller node 12 further comprises the PostScript splitter 62, a supervisor module 36, a collector module 38, and optionally an imposition handler module 40. Additionally, a buffer 42 is coupled to the controller node 12 and to a printer 44 (e.g., a print engine, marker module or the like).

The PostScript splitter 62 builds partially completed chunks, maintaining one chunk 24 per available RIP module 26. As chunks 24 are completed, the PostScript splitter 62 closes them and begins building new chunks. While a chunk 24 is open, the RIPs 26 are free to begin processing them. Until they are closed by the PostScript splitter 62, the RIPs 26 do not receive an end-of-file message, but rather a "block" message when they attempt to read beyond the portion written. In one example, the PostScript splitter 62 opens and begins writing all pending chunks concurrently. In another example, the PostScript splitter 62 buffers in-progress chunks locally until they are complete, and then sends the complete chunks to the RIPs 26 for processing.

According to another aspect, the systems and methods described herein employ an intelligent printer data stream (IPDS) splitter that functions in a manner similar to the PostScript splitter 62, except that chunks need not be closed, except at the end of a job (e.g., when all chunks have been processed).

Figure 4:
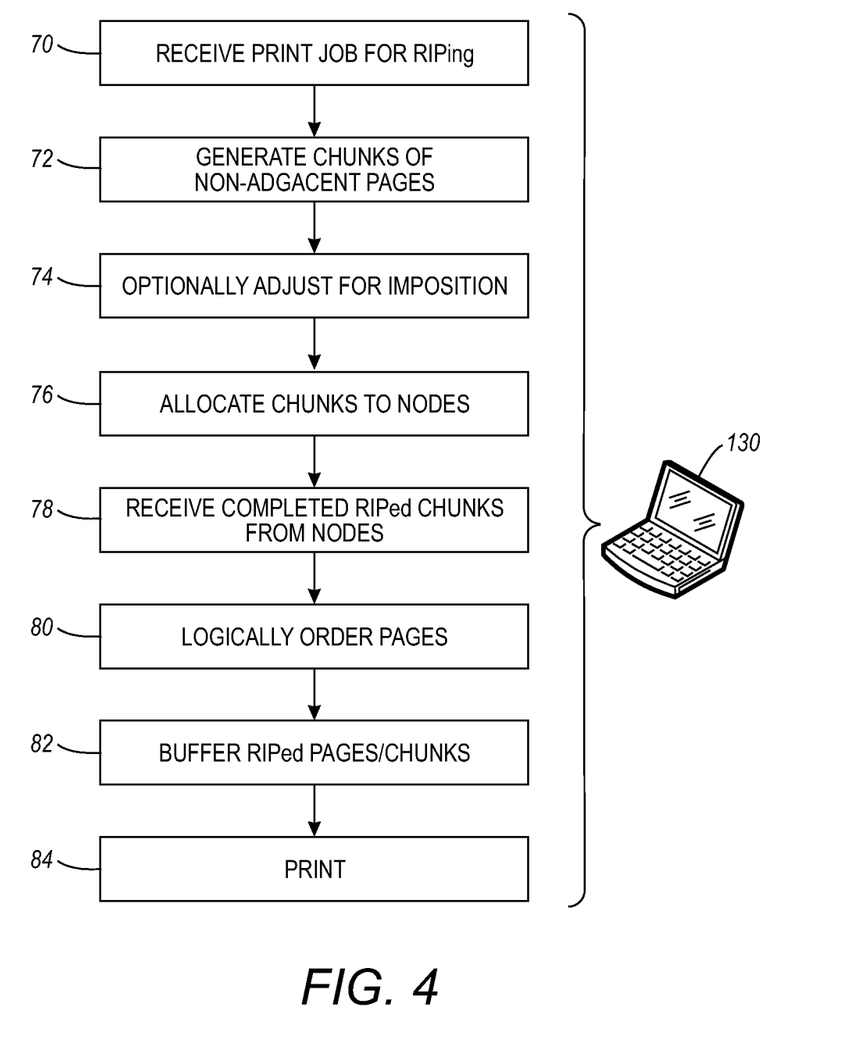
FIG. 4 illustrates a method of processing a plurality of interleaved chunks of pages of a PDF document using a page parallel RIP protocol, in accordance with one or more aspects described herein.

FIG. 4 illustrates a method of processing a plurality of interleaved chunks of pages of a PDF document using a page parallel RIP protocol, in accordance with one or more aspects described herein. At 70, a print job input file is received at a governing node (e.g., computer or processing node) for raster image processing. Interleaved chunks of non-adjacent pages are generated at 72, such that each chunk of pages contains at least two non-contiguous pages in document(s) to be RIPed. When generating the chunks, pages for each chunk can be selected as a function of a skip count number N (e.g., an integer greater than 1), a predefined page number list defining pages for each chunk, or randomly with the only constraint being that not only adjacent or contiguous pages are assigned to the same chunk. For instance, every $N^{th}$ page can be assigned to a first chunk, every $(N+1)^{th}$ assigned to a second chunk, every $(N+2)^{th}$ page to a third chunk, and so on.

At 74, adjustments are made for imposition, if needed. At 76, chunks are allocated to subordinate nodes for RIPing. That is, each of a plurality of nodes in a network receives at a chuck to process. Once a chunk has been fully processed, the completed chunk is received at the governing node, until all completed chunks have been received, at 78. At 80, pages in completed chunks are logically ordered. For instance, if pages 1, 3, and 5 were assigned to a first chunk processed by a first node, and pages 2, 4, and 6 were assigned to a second chunk processed by a second node, then at 80, the processed pages from both chunks are reordered sequentially (e.g., 1, 2, 3, 4, 5, 6). At 82, the logically ordered pages are buffered (e.g., temporarily stored) for printing. At 84, the buffered pages are printed and output.

Figure 5:
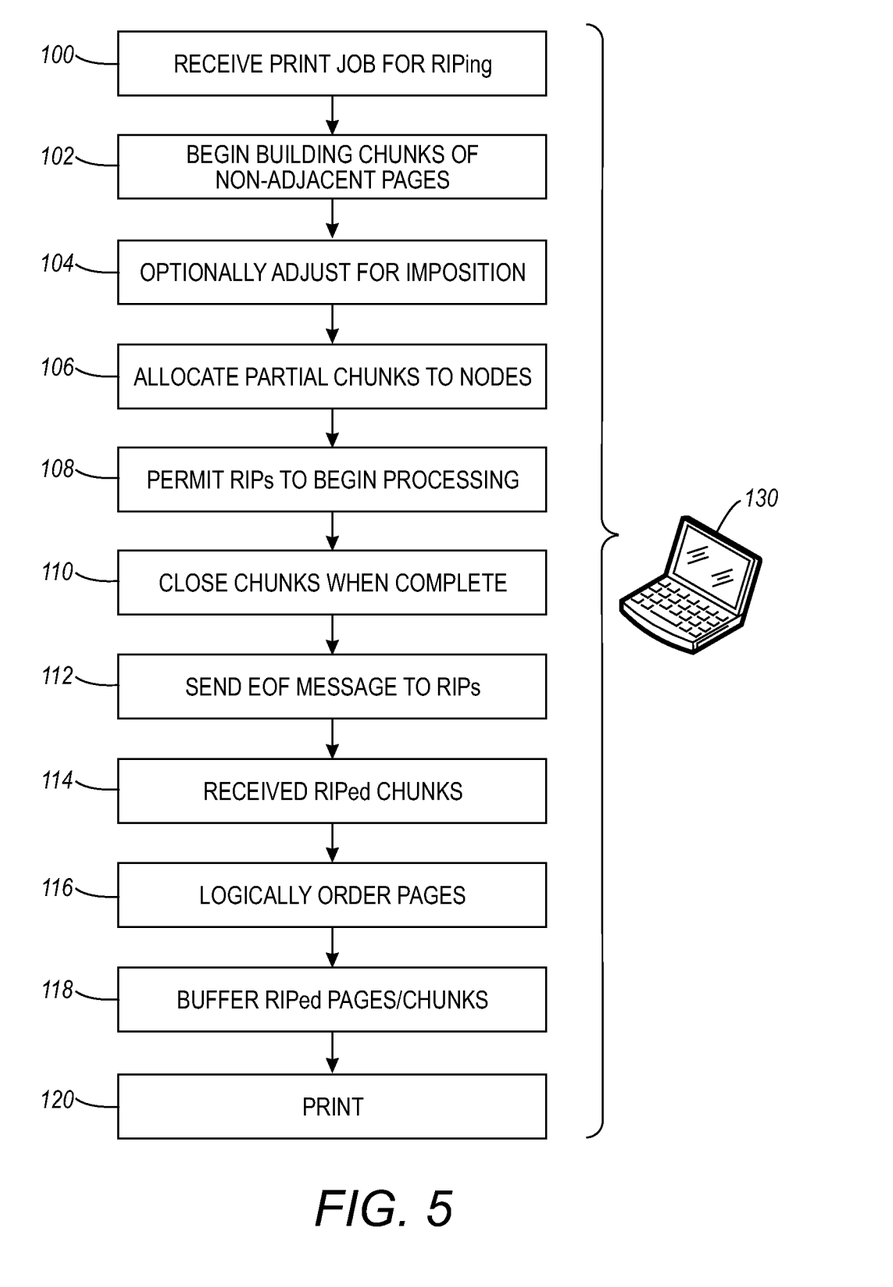
FIG. 5 illustrates a method for processing a plurality of interleaved chunks of pages of a PostScript document using a page parallel RIP protocol, in accordance with one or more aspects described herein.

FIG. 5 illustrates a method for processing a plurality of interleaved chunks of pages of a PostScript document using a page parallel RIP protocol, in accordance with one or more aspects described herein. At 100, a print job input file is received for RIPing. At 102, generation of chunks comprising non-adjacent pages is begun. At 104, adjustments for imposition are optionally made. At 106, partial chunks are allocated to RIP nodes. That is, chunks that are not completely built or generated are allocated to nodes. Nodes are permitted to begin RIPing the partial chunks, at 108. At 110, each chunk is "closed" when completed (e.g., when all pages to be assigned to the chunk have been assigned). At 112, an end-of-file (EOF) message for each complete chunk is sent to the node processing the chunk. The EOF message indicates to the node that no further pages will be written to the chunk. Thus, the node knows that the chunk is complete upon the last page in the chunk being RIPed.

At 114, RIPed chunks (e.g., completely processed chunks) are received (e.g., at a governing node) from the processing node (e.g., a subordinate node). At 116, pages from all received, completely processed chunks are logically ordered. For instance, if a first chunk comprises pages 1, 4, and 7, a second chunk comprises pages 2, 5, and 8, and a third chunk comprises pages 3, 6, and 9, then upon receipt of each processed page, the pages are logically ordered as 1, 2, 3, 4, 5, 6, 7, 8, 9. That is, as pages are ripped they are ordered, regardless of whether the chunk to which they belong has been completed. For instance, if pages 1 and 4 in the first chunk are ripped before page 2 in the second chunk is completed, the logical ordering of pages at this point will be 1, 4. If page 2 is the next page completed, the logical ordering will be 1, 2, 4, etc. At 118, the logically ordered pages are stored to a print buffer to await printing. At 120, the buffered pages are printed.

The methods illustrated in FIGS. 4 and 5 may be implemented in a computer program product that may be executed on a computer 130 or computing device (e.g., node) in the system of FIGS. 1-3. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 14 of FIG. 1, a system memory such as the memory 16 of FIGS. 1-3, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that facilitates raster image processing interleaved chunks in a distributed computing network, comprising:
- at least one subordinate node comprising a raster image processor and which receives at least one interleaved chunk for raster image processing;
- a controller node, operatively coupled to the at least one subordinate node, that receives an input file comprising a plurality of pages for raster image processing, the controller node comprising:
  - a supervisor module that provides a skip count (N) for generating interleaved chunks comprising at least two non-adjacent pages of the input file;
  - a splitter module that generates the interleaved chunks using the skip count in order to identify the at least two non-adjacent pages for inclusion in each interleaved chunk, wherein the skip count comprises an integer N greater than or equal to 1, such that the non-adjacent pages in each interleaved chunk are logically separated by N pages;
  - a collector module that receives an indication that at least one raster image processed page is complete, and reports page number information for the at least one raster image processed page to the supervisor module;
  - wherein the collector module logically orders raster image processed pages as they are completed by the at least one subordinate node.

2. The system of claim 1, further comprising a printer that prints the logically ordered, raster image processed pages.

3. The system of claim 1, wherein the controller node further comprises an imposition handler module that is executed by the processor and which accounts for multiple pages being printed on a single sheet when generating the interleaved chunks, so that adjacent sheets of pages are allocated to different chunks.

4. The system of claim 1, wherein the input file is one of a portable document format (.pdf) file and a PostScript-formatted file.

* * * * *